(12) United States Patent
Ie

(10) Patent No.: US 11,228,633 B1
(45) Date of Patent: *Jan. 18, 2022

(54) DETERMINING PROFILE SIGNATURES ASSOCIATED WITH SETS

(71) Applicant: Pinterest, Inc., San Francisco, CA (US)

(72) Inventor: Tze Way Eugene Ie, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/091,770

(22) Filed: Nov. 6, 2020

Related U.S. Application Data

(63) Continuation of application No. 16/359,794, filed on Mar. 20, 2019, now Pat. No. 10,833,970, which is a continuation of application No. 15/235,754, filed on Aug. 12, 2016, now Pat. No. 10,263,877.

(51) Int. Cl.
   *H04L 29/08* (2006.01)
   *G06F 16/906* (2019.01)
   *H04L 12/26* (2006.01)
   *H04L 12/24* (2006.01)

(52) U.S. Cl.
   CPC ............ *H04L 67/02* (2013.01); *G06F 16/906* (2019.01); *H04L 41/12* (2013.01); *H04L 43/16* (2013.01); *H04L 67/10* (2013.01); *H04L 67/306* (2013.01)

(58) Field of Classification Search
   CPC ......... H04L 67/02; H04L 41/12; H04L 43/16; H04L 67/306; H04L 67/10; G06F 16/906
   See application file for complete search history.

(56) References Cited

U.S. PATENT DOCUMENTS

| 6,029,195 A | 2/2000 | Herz |
| 6,418,433 B1 | 7/2002 | Chakrabarti et al. |
| 7,536,413 B1 | 5/2009 | Mohan et al. |
| 7,657,100 B2 | 2/2010 | Gokturk et al. |
| 7,890,514 B1 | 2/2011 | Mohan et al. |
| 8,346,802 B2 | 1/2013 | Friedlander et al. |
| 8,442,996 B2 | 5/2013 | Maim |
| 8,688,782 B1 | 4/2014 | Lin et al. |
| 8,954,412 B1 | 2/2015 | Zhao et al. |
| 9,015,150 B2 | 4/2015 | Raghavan et al. |
| 9,277,257 B1 | 3/2016 | Nijim et al. |
| 9,363,223 B2 | 6/2016 | Arquette et al. |
| 9,497,154 B2 | 11/2016 | Lindsay et al. |
| 10,263,877 B1 * | 4/2019 | Ie ............................ H04L 43/16 |
| 10,833,970 B1 * | 11/2020 | Ie ............................ H04L 67/02 |
| 2003/0126136 A1 | 7/2003 | Omoigui |

(Continued)

*Primary Examiner* — Michael Won
(74) *Attorney, Agent, or Firm* — Athorus, PLLC

(57) ABSTRACT

Described are systems and methods for establishing and generating collections of sets that contain object identifiers based on user provided annotations for the object identifiers. A set may include one or more object identifiers and each object identifier may include one or more user provided annotations. Annotations from all object identifiers within a set are processed to form a set profile signature representative of the set. The set profile signatures are then compared between different sets to identify similar sets. Similar sets are included in a collection. Utilizing set profile signatures for a set formed based on user provided annotations provides useful relationships between sets that might otherwise not exist.

20 Claims, 11 Drawing Sheets

(56) References Cited

U.S. PATENT DOCUMENTS

| | | |
|---|---|---|
| 2005/0120030 A1 | 6/2005 | Varpela et al. |
| 2005/0203801 A1 | 9/2005 | Morgenstern et al. |
| 2005/0288939 A1 | 12/2005 | Peled et al. |
| 2006/0053157 A1 | 3/2006 | Pitts |
| 2007/0150299 A1 | 6/2007 | Flory |
| 2007/0198481 A1 | 8/2007 | Hogue et al. |
| 2007/0198598 A1 | 8/2007 | Betz et al. |
| 2009/0234878 A1 | 9/2009 | Herz et al. |
| 2010/0005072 A1 | 1/2010 | Pitts |
| 2010/0332583 A1 | 12/2010 | Szabo |
| 2011/0004692 A1 | 1/2011 | Occhino et al. |
| 2011/0137932 A1 | 6/2011 | Wable |
| 2011/0196855 A1 | 8/2011 | Wable et al. |
| 2011/0295851 A1 | 12/2011 | El-Saban et al. |
| 2012/0023563 A1 | 1/2012 | Morgenstern et al. |
| 2013/0041653 A1 | 2/2013 | Tseng |
| 2013/0073568 A1 | 3/2013 | Federov et al. |
| 2013/0073979 A1 | 3/2013 | Shepherd et al. |
| 2013/0073983 A1 | 3/2013 | Rasmussen et al. |
| 2013/0080565 A1 | 3/2013 | Coppenolle et al. |
| 2013/0132230 A1 | 5/2013 | Gibson et al. |
| 2013/0204940 A1 | 8/2013 | Kinsel et al. |
| 2013/0254283 A1 | 9/2013 | Garcia-Martinez et al. |
| 2013/0268973 A1 | 10/2013 | Archibong et al. |
| 2013/0282811 A1 | 10/2013 | Lessin et al. |
| 2013/0339450 A1 | 12/2013 | Flinn et al. |
| 2014/0012925 A1 | 1/2014 | Narayanan et al. |
| 2014/0074926 A1 | 3/2014 | Bosworth et al. |
| 2014/0089418 A1 | 3/2014 | Davenport et al. |
| 2014/0181071 A1 | 6/2014 | Pidduck et al. |
| 2015/0016712 A1 | 1/2015 | Rhoads et al. |
| 2015/0046528 A1 | 2/2015 | Piepgrass et al. |
| 2015/0264093 A1 | 9/2015 | Madisch et al. |
| 2015/0295879 A1 | 10/2015 | Jung et al. |
| 2015/0356183 A1 | 12/2015 | Green et al. |
| 2015/0356374 A1 | 12/2015 | Mase |
| 2015/0363402 A1 | 12/2015 | Jackson et al. |
| 2016/0034514 A1 | 2/2016 | Singhal et al. |
| 2016/0042067 A1 | 2/2016 | Weng et al. |
| 2016/0147893 A1 | 5/2016 | Mashiach et al. |
| 2016/0188201 A1 | 6/2016 | Hosier |
| 2016/0188704 A1 | 6/2016 | Dassa et al. |
| 2016/0202879 A1 | 7/2016 | Chen et al. |
| 2016/0232241 A1 | 8/2016 | Stoyanov et al. |
| 2016/0328480 A1 | 11/2016 | Owens et al. |
| 2016/0350675 A1 | 12/2016 | Laks et al. |
| 2017/0024091 A1 | 1/2017 | Hosier |
| 2017/0083523 A1 | 3/2017 | Philip et al. |
| 2017/0149852 A1 | 5/2017 | Selekman et al. |
| 2017/0185603 A1 | 6/2017 | Dentel et al. |
| 2017/0185682 A1 | 6/2017 | Green et al. |
| 2017/0185689 A1 | 6/2017 | Kumar et al. |
| 2017/0244805 A1 | 8/2017 | Callies et al. |
| 2017/0295249 A1 | 10/2017 | Vickrey et al. |
| 2018/0101774 A1 | 4/2018 | Werris |
| 2018/0139293 A1 | 5/2018 | Dimson et al. |
| 2018/0239823 A1 | 8/2018 | Singh et al. |
| 2018/0260843 A1 | 9/2018 | Hiranandani et al. |
| 2018/0314976 A1 | 11/2018 | Miao et al. |
| 2018/0349499 A1 | 12/2018 | Pawar et al. |
| 2018/0373959 A1 | 12/2018 | Rhoads et al. |
| 2019/0012387 A1 | 1/2019 | Li et al. |
| 2019/0057154 A1 | 2/2019 | Philip et al. |
| 2019/0065594 A1 | 2/2019 | Lytkin et al. |
| 2019/0101985 A1 | 4/2019 | Sajda et al. |
| 2019/0361861 A1 | 11/2019 | Rogynskyy et al. |

\* cited by examiner

FIG. 9

DETERMINING PROFILE SIGNATURES ASSOCIATED WITH SETS

PRIORITY CLAIM

This application is a continuation of and claims priority to U.S. patent application Ser. No. 16/359,794, filed Mar. 20, 2019, and titled "Reducing Collections of Sets," which is a continuation of and claims priority to U.S. patent application Ser. No. 15/235,754, filed Aug. 12, 2016, and titled "Generating Collections of Sets Based On User Provided Annotations." Both applications are herein incorporated by reference in their entireties.

BACKGROUND

People are increasingly interacting with computers and other electronic devices in new and interesting ways. With the increased processing capabilities, connectivity and location tracking, electronic devices have become widespread and used in many everyday activities. For example, people often use electronic devices to search for products, watch videos, listen to music, research, shop for both digital and physical products ("e-commerce"), and receive news, just to name a few. Other uses include communicating with social communities, friends and family, photography, and many others.

Objects are typically made available and people search for objects based on information about the object for which they are searching. Keywords that describe an object are often associated with the object and when people search using one or more of those keywords the object may be returned as a result. While this provides a good foundation for searching for objects based on information about the object, it limits the ability for individuals to search for, share, discover, and experience objects in other ways.

BRIEF DESCRIPTION OF THE DRAWINGS

The detailed description is set forth with reference to the accompanying figures. In the figures, the left-most digit(s) of a reference number identifies the figure in which the reference number appears.

FIG. 9 illustrates an example user interface for a plurality of collections of sets, according to an implementation.

Figure 1:
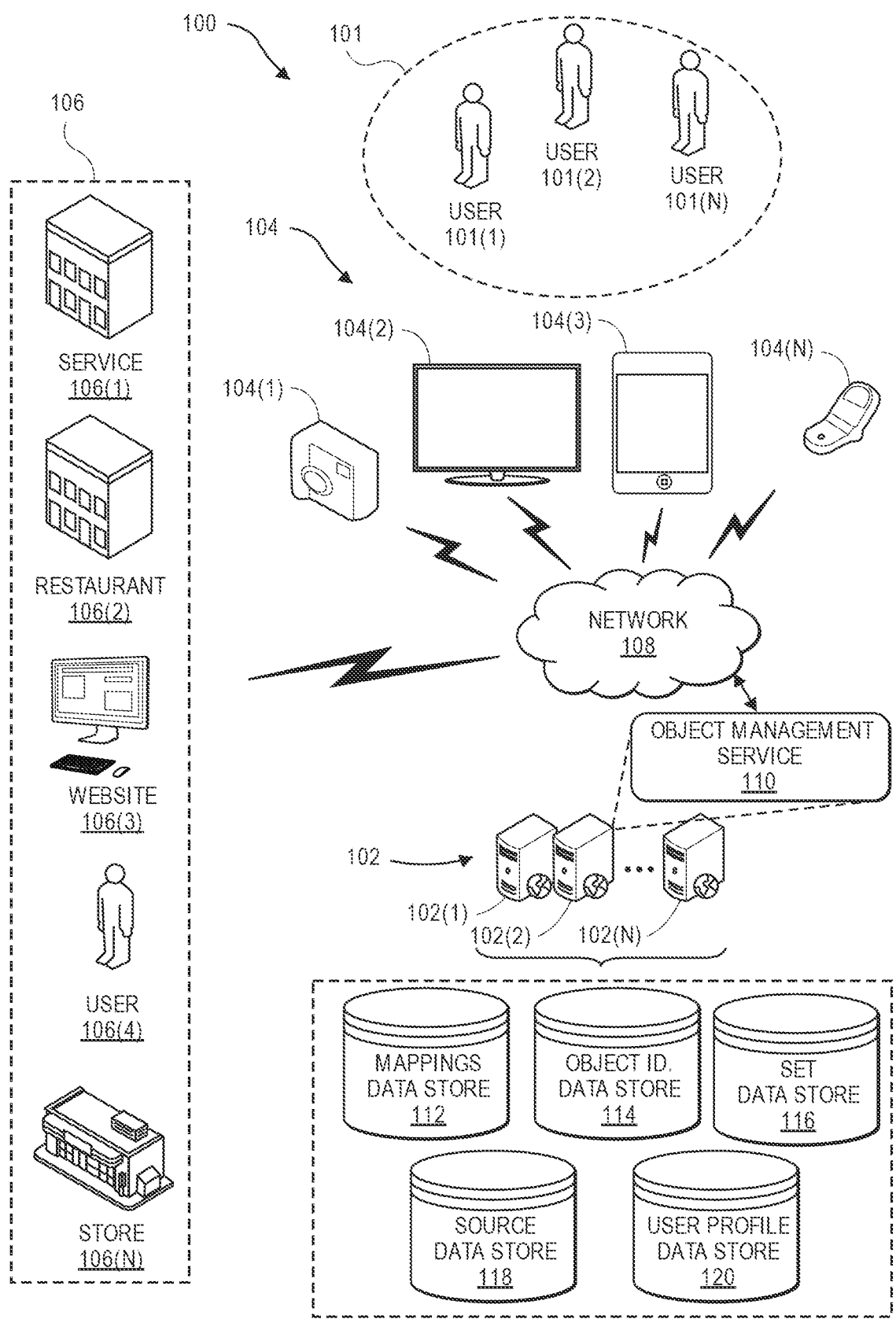
FIG. 1 is a pictorial diagram of an illustrative environment that includes a server system and a client device communicatively connected via a network, according to an implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes systems and methods for establishing and generating collections of sets that contain object identifiers based on user provided annotations for the object identifiers. Users may create object identifiers by, for example, uploading, sharing, selecting, etc., an image of an object and providing one or more annotations (e.g., comments) about the object represented in the image and/or the image itself. Multiple object identifiers may be arranged into sets that include one or more object identifiers. To facilitate discovery and user trends, the described implementations first reduce the corpus of all potential sets based on links between sets. As discussed below, sets may be considered linked if they include similar or the same object identifiers, similar users who add or annotate object identifiers within the sets, similar representations included in the object identifiers, etc. A probability of a user navigating between linked sets is then determined and linked sets with a low probability, and/or sets that are not linked are removed from the corpus.

In addition, the corpus is then further reduced by determining a similarity between linked sets based on user provided annotations associated with object identifiers of those linked sets. For example, the annotations associated with object identifiers of a set may be processed to determine a set profile signature for the set. The set profile signature indicates a similarity of object identifiers of the set and an overall signature of the set based on the user provided annotations associated with object identifiers of that set. A set that includes multiple, similar object identifiers (e.g., numerous object identifiers about dogs) that have common or similar annotations and/or unit groups (discussed below) within those annotations will have a set profile signature of a first type. A set that includes multiple object identifiers that relate to different objects (i.e., are not similar) and have different annotations will have a very different set profile signature because of the lack of commonality or similarity between the annotations.

Collections of sets may then be formed based on a similarity between the set profile signatures. Because the set profile signatures are based on user provided annotations associated with object identifiers of the sets, even if two sets do not include the same or similar object identifiers and/or have a lower probability link, the two sets may be associated if they each include similar annotations.

Such a correlation is beneficial to identify common trends or themes and assist users in discovering other object identifiers that are related to the same topic (e.g., dogs). Likewise, in some instances, two sets may not be associated even though they include the same or similar object identifiers if the annotations do not correspond. For example, a first set may include multiple images of fish and annotations relating to the fish as a form of wildlife that needs to be protected. A second set may also include multiple images of fish and annotations about fish recipes. Even though both sets may include the same or similar representations of fish, the sets will not be associated because the annotations, as represented by the set profile signatures, are different.

For purposes of discussion, an "object identifier," as used herein, is a collection of one or more items of information that identifies an object based on a user's perspective, or context. The object identifier may include any combination of: a representation of the object, such as a graphical representation, audible representation, or other representation of the object; a context for the object as understood by the user; a description or annotation of the object provided by the user; static information about the object; supplemental information about the object; the set to which the object belongs (discussed below); the source of the object; any parent object identifier from which the object identifier was created; and any identification of other similar object identifiers. As will be appreciated, additional or fewer items of information may be included in an object identifier. In some implementations, annotations corresponding to the object may be obtained from other object identifiers and/or other sets that includes similar object identifiers.

As discussed in further detail herein, a context represents information about an object as understood by the user. The context explains why the object is important to the user who created the object identifier. In some implementations, context(s) may be provided directly by the user or determined based on other information provided by or about the user, such as annotations. Static information about an object may be any information about the object that does not change. Such information may be provided by the user, by other users, by external sources, and/or by the methods and systems described herein.

The methods and systems described herein further enable users to manage, search for, share and discover objects by organizing object identifiers into "sets." For example, users may create one or more sets and object identifiers may be associated with those sets. Generally, a "set" is a collection of object identifiers created by a user. In one implementation, each set may include any number of object identifiers, including zero (a null set). An object identifier may be associated with one or many sets. In one implementation, an object identifier may only be associated with one set. Like object identifiers, sets may have a title, context and/or annotations. A set may also include a category, such as travel, sports, animals, art, education, food and drink, etc.

A "unit" as used herein is any form of a character, symbol, number, and/or other identifier. For example, a unit may be a letter, a word, a combination of letters (e.g., lol), a number, a combination of numbers, a combination of letters and numbers, a symbol, a combination of symbols, a combination of letters and symbols, a combination of numbers and symbols, a combination of letters, numbers and symbols, etc. An "item" as used herein, may be any one of an object, a representation, an object identifier, a set, and/or a user. An "annotation" as used herein, may by any information, such as a unit, provided by a user and/or an external source.

Users can create object identifiers and add them to sets based on representations for objects provided or identified by the user or by adding existing object identifiers to their own set of object identifiers. An "object" may be anything that can be represented. For example, a user may create an object identifier for a television show, an image, a physical object, a sound, a web page, a location, a digital object, and the like. The user may also provide annotations to describe the identified object. Object identifiers created with representations provided or identified by a user are considered parent object identifier relationships. Object identifiers created based on existing object identifiers are considered child object identifiers, and may in some implementations inherit the annotations of the parent object identifier. An object identifier may have any number of parent and/or child object identifiers.

FIG. 1 is a pictorial diagram of an illustrative environment 100 that includes users 101, such as users 101(1), 101(2)-101(N), a server system 102 that includes one or more server computers 102(1), 102(2)-102(N), one or more client devices 104, such as client device 104(1), 104(2), 104(3)-104(N), and one or more external sources 106, such as a service offering 106(1), restaurant 106(2), website 106(3), user 106(4)-store 106(N) communicatively connected via a network 108. As will be appreciated, any number and/or type of server systems 102, client devices 104 and/or external source 106 may be included in the environment 100 and those illustrated in FIG. 1 are only exemplary. Likewise, any number of users 101 may be included in the environment 100. For purposes of this discussion, the term "user" will be used herein to refer to an individual interacting with the server system 102 and/or the object management service 110 (discussed below).

The network 108 may include a local area network, a wide area network, such as a public switched telephone network (PSTN), a cable television network, a satellite network, a collection of networks, a public Internet protocol network, a private Internet protocol network, or a combination thereof. Moreover, the network 108 may be wired, wireless, or a combination of the two. The server system 102 may also include a mappings data store 112, an object identifier data store 114, a set data store 116, a source data store 118, and a user profile data store 120. As discussed further below, the data stores may include lists, arrays, databases, and other data structures used to provide storage and retrieval of data. Likewise, while the disclosure describes multiple data stores, in some implementations, the data stores may be configured as a single data store or multiple data stores.

The mappings data store 112, object identifier data store 114, set data store 116, source data store 118, and user profile data store 120 may be integrated with the server system 102 or otherwise communicatively coupled with the server system 102. For example, one or more of the mappings data store 112, object identifier data store 114, set data store 116, source data store 118, and user profile data store 120 may be located at a remote computing resource (not shown) and communicatively coupled with the server system 102. In some implementations, the mappings data store 112, object identifier data store 114, set data store 116, source data store 118, and user profile data store 120 may include one or more CD-RW/DVD-RW drives, hard disk drives, tape drives, or other storage devices that are utilized to store digital content and information. The server system 102, separately or together with the mappings data store 112, object identifier data store 114, set data store 116, source data store 118, and user profile data store 120, may provide an object management service 110 that facilitates user 101 exploration, discovery, annotation and/or sharing of object identifiers, creation, management and/or annotation of sets into which one or more object identifiers may be included, adding/updating of supplemental information by external sources 106 and/or the object management service 110, and/or generation of collections of sets.

In some implementations, the server system 102 may also be configured to exchange information with one or more external sources 106. The external sources 106 may include any type of entity and/or individual(s) that provides a service, product or information that may be used to supplement an object identifier and/or representation of an object. For example, external sources 106 may include a service offering 106(1), such as local weather, time, streaming video of a location, etc., restaurants 106(2), websites 106(3), users 106(4) and stores 106(N), such as a toy store, grocery store, electronic commerce (e-commerce) store, book store, etc. External sources may be associated with a fixed location(s), such as their place of business, a location that may change (e.g., hiking guide, mobile health provider) depending on the external sources' current location, or no location at all (e.g., digital or virtual business). Digital or virtual businesses, such as websites 106(3), include any form of e-commerce or other digital offering that may provide supplemental information.

For example, an e-commerce site may provide a shopping cart or purchase button, also referred to herein as a buy button, (supplemental information) that can be used to initiate an action to purchase the object. A user, when viewing the object identifier that includes a representation of the object with which the e-commerce site has associated a purchase button, may interact with that supplemental information and initiate a purchase of the object represented by the object identifier.

In some implementations, the external source 106 may interact with the object management service 110 and provide representations for objects along with supplemental information and/or annotations that could then be used to form object identifiers for users. For example, if the external source 106 is a boutique home furnishing store, the home furnishing store may provide graphical representations for each object they offer for sale in the store along with annotations describing each object.

Returning to FIG. 1, client devices 104 may include personal computers, tablet computers, electronic reader devices, laptop computers, desktop computers, netbooks, personal digital assistants (PDA), portable gaming devices, wireless communication devices, such as smart phones or mobile handsets, set-top-boxes, game consoles, cameras, audio recorders/players, or any combination thereof. As will be described with regard to the implementations shown herein, the server system 102 is configured to exchange data and information, including information about users, sets, collections, representations, object identifiers, and other like information with the client device 104. For example, the object management service 110 may interact via the server system 102 to determine a user's location, provide representations of objects near the user's location, enable a user to select a representation of an object, create an object identifier, add annotations and/or include that object identifier in a user's set of object identifiers. As another example, the object management service 110 may generate a collection of sets that are provided to a client device 104. The collection is sets may be generated based at least in part on the user's preferences, user profile, the user's location, etc.

Likewise, a user 101 may interact with the object management service 110, via a client device 104, to create, discover, view and/or annotate object identifiers and sets of object identifiers, obtain information about (or purchase) objects identified by an object identifier, and/or to communicate with others. For example, a user 101, Steve in this example, may submit a request to create an object identifier for a race car by providing an image (representation) of the race car and add that object identifier to his set called Birthday Celebration. The user, Steve, may provide an annotation, such as "The race car I drove for my birthday present!" for inclusion in the object identifier. The client device 104 may determine and provide the user's location information and the request to the object management service 110. The object management service 110 may receive the information, determine a context for the object identifier based on the representation, the annotation provided by Steve, the context associated with the set with which the object identifier is to be associated, and optionally the location information. An object identifier that includes the representation, annotation and/or context(s) may then be established by the object management service 110 and associated with Steve's set of object identifiers called Birthday Celebration.

The object management service 110 may also utilize the provided representation and/or annotations to determine links or associations with other object identifiers and/or sets. For example, the set of object identifiers may be compared with other sets and if a minimum number of common annotations, title, or similar object identifiers are in the compared set, the two sets may be included in the same corpus of sets and a probability determined for the relationship indicating a probability that a user when viewing one set, would discover, navigate to or be interested in object identifiers of the other set.

The mappings data store 112 stores information about the relationships between object identifiers, sets, users, representations and external sources that provide supplemental information. For example, for each object identifier, a relationship with other object identifiers may be maintained based on, for example, the similarity between represented objects, annotations, the determined context, etc. Likewise, if the object identifier was added to a user's set from another object identifier, not only is the relationship between the user's set and the object identifier maintained, a link or relationship between the prior object identifier (the parent) and the current object identifier is also maintained. In some implementations, there may be a chain of relationships/links between multiple object identifiers, each link representing a parent object identifier from which the current object identifier was created.

For example, user A may create an object identifier representing the Empire State Building and include an image of the Empire State Building (representation) taken by user A. That object identifier may be associated with user A's set of object identifiers called "Buildings I Visited on Vacation." User A may also provide an annotation for the object identifier, such as "Visited the Empire State Building on day 1." The object management service 110 may compare the annotation with an existing dictionary of unit groups, identify the unit group "Empire State Building" and generate relationships between the object identifier and other object identifiers and/or sets with the same unit group.

User B may view user A's object identifier and create their own object identifier by selecting to add user A's object identifier to one of user B's sets of object identifiers. In this example, a new object identifier is created for user B that includes the representation of the Empire State Building from user A's object identifier and is associated with one of user B's sets. User B may utilize the annotation provided by user A and/or add his/her own annotation. A link or other relationship between user A's object identifier and user B's object identifier is maintained in the mappings data store 112.

The object identifier data store 114 maintains information about each object identifier created by the object management service 110. For example, for each object identifier, the object management service 110 may store in the object identifier data store 114 information as to the representation included in the object identifier, the set to which the object identifier is associated, the user that created the object identifier, the context for the object identifier, any provided annotations for the object identifier, any supplemental information associated with the object identifier, the source of the representation included in the object identifier and any parent object identifier from which information was obtained. Additional description about the object identifiers is provided below with respect to FIG. 2.

The set data store 116 includes information about each set established by users of the object management service 110. As discussed above, a set is a collection of object identifiers that a user creates. A set may be a null set that does not include any object identifiers. Likewise, any number of object identifiers may be associated with a set. The set data store 116 for each set stores information that identifies the user that created the set, the context for the set, a category for the set, any user provided annotations for the set, any static information associated with the set and an identification of object identifiers associated with the set. Additional description about sets is provided below with respect to FIG. 2.

The source data store 118 stores information about sources of objects that are represented by object identifiers managed by the object management service 110 and/or information about external sources that provide supplemental information associated with representations of one or more objects. In some examples, the source may be a website from which an image was obtained to create an object identifier. In other examples, the source may be a physical location. In still other examples, a source may be any external entity that provides supplemental information, such as annotations, that is associated with representations of objects. For example, an external source may be a weather service that provides current weather information that is periodically updated and provided to users when viewing object identifiers for objects at specific locations.

The source data store 118 may include any form of information about each source including, but not limited to, the name of the source, whether the source has been verified by the object management service 110, the type of information provided by the source, identification of representations associated with the source, and the like.

The user profiles data store 120 stores information about users 101 of the object management service 110. Any type of information may be stored in the user profile data store 120. For example, user profile information, such as attributes, name, address, gender, browse history, object identifier history, set history, annotation or unit group history, social networks and/or friends with which the user 101 interacts, and the like may be stored in the user profiles data store 120. User profile information may be provided directly by users 101 and/or collected from users 101 of the client devices 104 when interacting with the object management service 110 (e.g., clickstream data as the user explores the object management service 110), when viewing, creating or interacting with sets, when viewing, creating or interacting with object identifiers, and/or when sharing information with friends or social communities through the object management service 110. In some implementations, user information may be obtained from external sources. For example, user profile information may be obtained from a third party with which the user is also affiliated (e.g., e-commerce web site, social network) and has agreed to allow sharing of some or all user profile information provided to that third party and/or collected by that third party. In some implementations, users of the object management service 110 may choose to limit the amount of information included in their user profile, to limit access to their user profile information and/or to limit what information is shared, if any, from their user profile information.

The user profile information maintained in the user profile data store 120 may be used by the object management service 110 in determining contexts for sets of objects created by the user, determining contexts for object identifiers created by the user and/or in identifying object identifiers that may be of interest to the user. Likewise, user profile information may be used to determine interest trends for a user and/or the user's current interest. For example, based on a user's past trends and provided annotations, the object management service 110 may determine that the user has three main interests, dirt bikes, dogs, and hiking. As discussed further below, based on comparisons of annotations provided by different users, the object management service 110 generate collections of sets that include other object identifiers that are likely to be of interest to the user based on the users determined interests.

In addition to maintaining information about mappings, object identifiers, sets, sources, and users, the object management service 110 may provide use information back to the users 101 and/or the external sources 106. For example, the object management service 110, through communication between the server system 102 and a client device 104, may provide use information back to a user 101. Such information may include an identification of object identifiers recently viewed, created or added, identification of others that have viewed the user's sets, object identifiers, and the like. Likewise, the object management service 110, through communication between the server system 102 and the external sources 106, may provide information to the external sources 106. Such information may include analytics about representations of objects associated with the external source 106, other external sources that may be associated with and provide supplemental information for an object with which the external source is associated, and the like.

Figure 2:
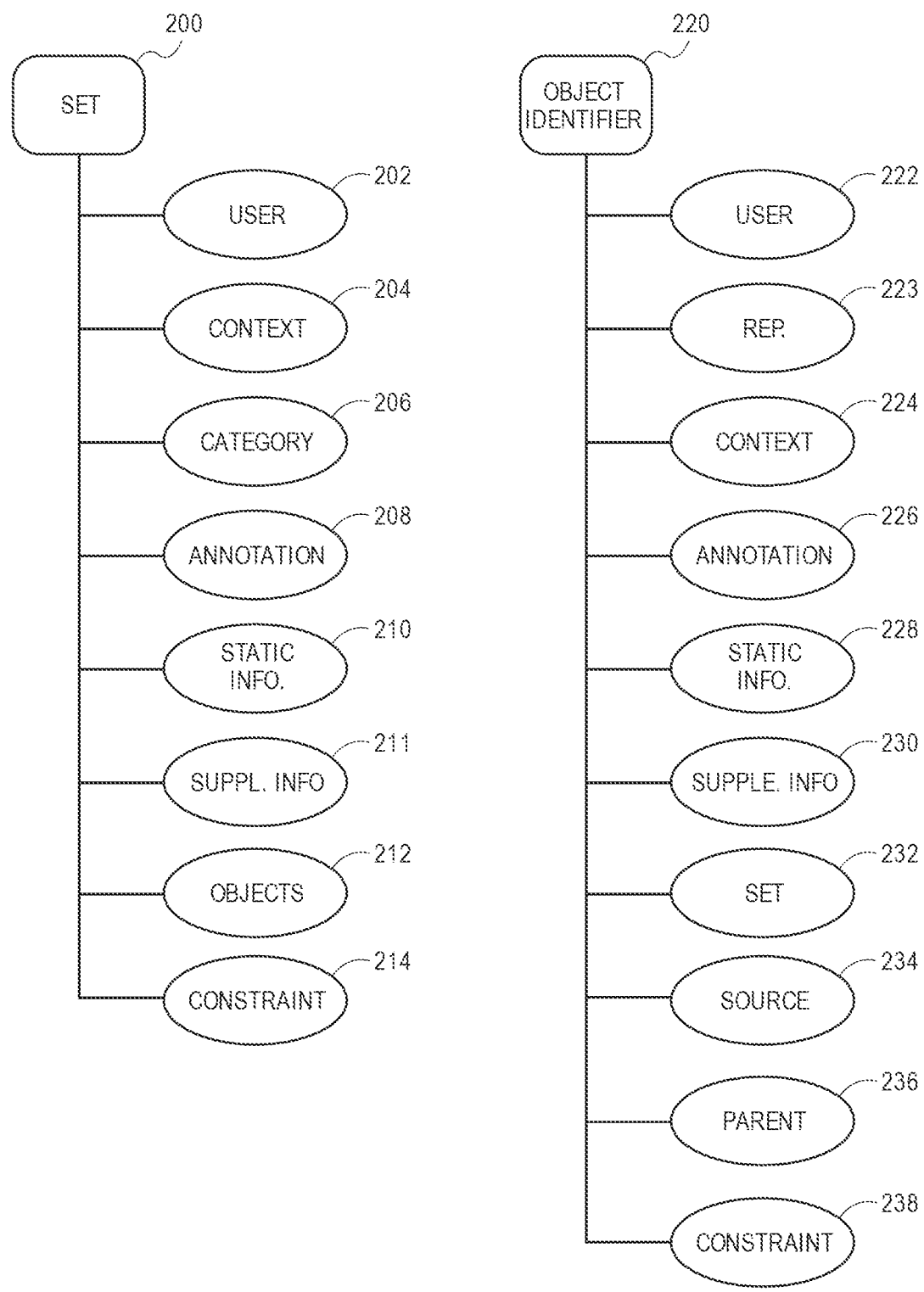
FIG. 2 is a block diagram of an example structure of a set and an object identifier, according to an implementation.

FIG. 2 is a block diagram of an example structure of a set 200 and an object identifier 220, according to an implementation. As discussed above, a set 200 may include an identification of the user 202 that created the set and any users that have been identified as allowed to add object identifiers to the set. In addition, a context 204 as provided by a user or determined by the object management service 110, may be associated with the set 200 along with a user selected category 206. A category 206 may be selected from a list of preexisting categories provided by the object management service 110. For example, a category 206 may be animals, books, arts and entertainment, sports, food and drink, etc. and a user, upon creating a set 200, may select one or more of those categories for association with the set 200. A user may also provide annotations 208 providing information about the set 200 from the user's perspective. Static information 210 may also be associated with the set 200. For example, the object management service 110 may automatically incorporate certain information relevant to a set 200 based on the selected category and optionally the provided annotation 208. Static information 210 may also include information provided by the creator of the set and/or other users of the object management service 110. For example, other users may view, comment, annotate and/or otherwise provide feedback with respect to a set. Annotations, comments and/or other feedback from the creator and/or other users may be associated with the set 200 and maintained as static information 210.

Supplemental information 211 relevant to the set 200 may also be maintained. Supplemental information for a set may be any form of information or action provided by a source of one or more representations associated with the set, a source of one or more objects associated with a set, or any other external source. For example, if the set is about Hawaii, a weather service (external source) may provide supplemental information in the form of weather in Hawaii that is associated with the set. As object identifiers are added to the set 200, they may be identified as objects 212 associated with the set 200.

Finally, constraints 214 may also be associated with the set 200 and used to control access, modification or other aspects of the set 200. For example, the creator of a set 200 may specify constraints as to who can view the set, add object identifiers to the set, whether users can comment on the set, etc.

In some implementations, an object identifier 220 may include an identification of the user 222 that created the object identifier 220, a user provided annotation 226 describing the object identifier from the user's perspective, and static information 228. Similar to the set 200, the static information 228 may be included in the object identifier 220 by the object management service 110 based on the selected representation 223 of the object and/or the annotation provided by the user. For example, if a user has selected a representation 223 of the object that is already known to the object management service, existing information about the representation may be included in the object identifier 220. Other static information about an object identifier 220 may include comments and/or annotations provided by other users of the object management service 110, the creator of the object identifier, etc.

A representation 223 may also be included in the object identifier. The representation may be any element that can be used to represent the object. For example, the representation may be a graphical representation of the object, an audio representation of an object, or any other representation of an object.

In addition to the object management service 110 providing static information 228, in some implementations, supplemental information 230 may also be associated with the object identifier 220. Supplemental information may be any form of information or action provided by a source of the representation, a source of the object, or any other external source. For example, the source of the object may provide information about the object while other external sources may provide actions relevant to the object. For example, if the object is a television, the source of the television may be the manufacturer, such as Sony, and that source may provide basic information about the object. In this example, the information about the object provided by the manufacturer may include the dimensions, resolution, weight, etc. Other external sources, such as sellers of the television, may provide additional supplemental information that may be associated with the object identifier 220. For example, sellers of the object may provide actions that allow a user viewing the object identifier 220 to initiate a purchase of the object, obtain additional information about the object, obtain information about the external source selling the object, etc.

Returning to FIG. 2, the object identifier 220 may also identify a source 234 from which the representation of the object was obtained, or the source of the object. In addition to providing a source 234, if the object identifier was based upon and created from another existing object identifier, that existing object identifier may be identified in the object identifier 220 as the parent 236 of the object identifier 220. In addition, the object identifier may be associated with one or more sets 232. Finally, constraints 238 may also be associated with the object identifier 220 and used to control access, modification or other aspects of the object identifier 220. For example, the creator of an object identifier 220 may specify constraints as to whether the object identifier can be viewed by other users, copied into other sets, whether users can add annotations to the object identifier, etc.

Figure 3:
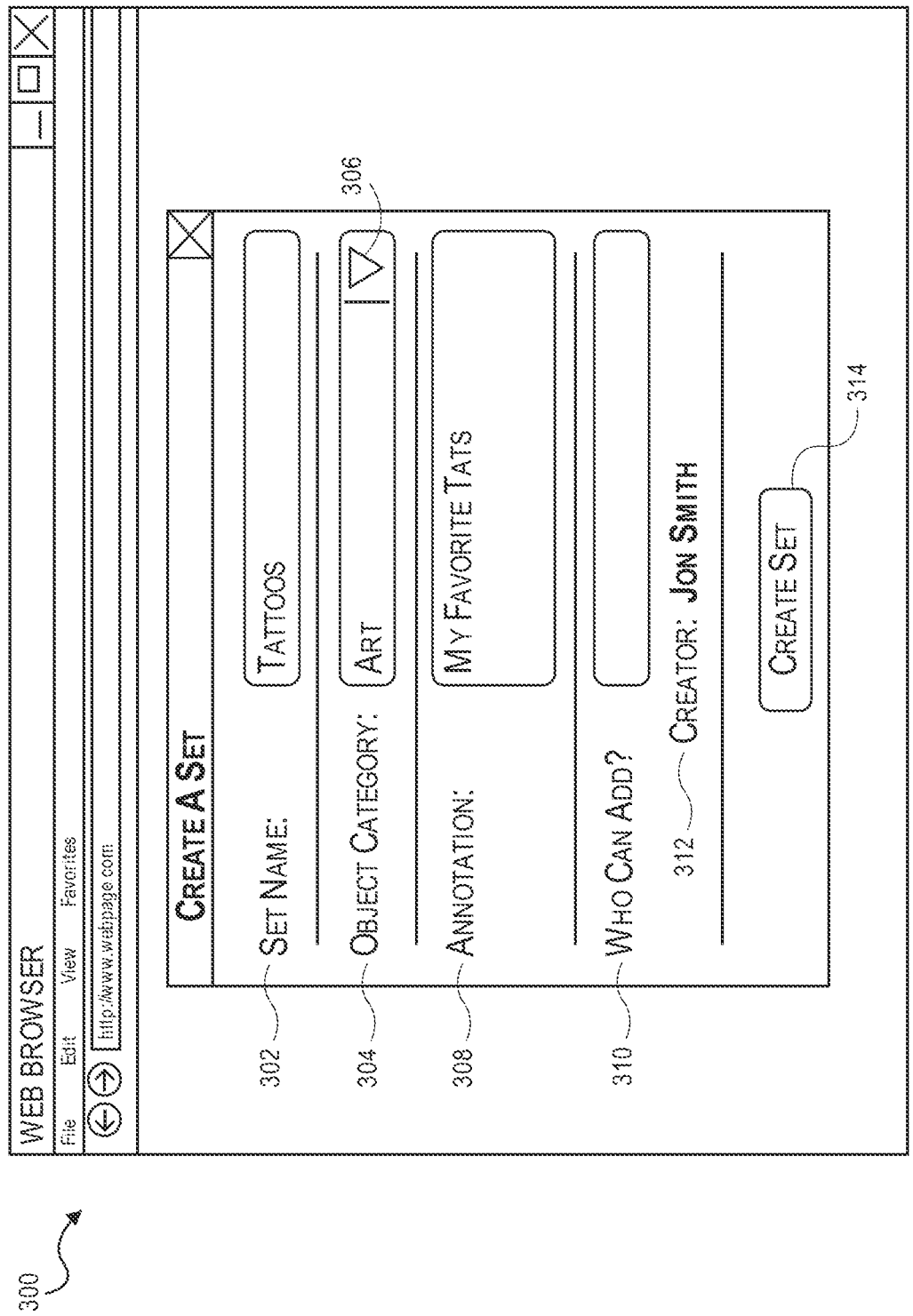
FIG. 3 is a block diagram of an example user interface for creating a set, according to an implementation.

FIG. 3 is a block diagram of an example user interface 300 for creating a set, according to an implementation. As illustrated in the example user interface 300 a user interacting with the object management service 110 may submit a request to create a set and be provided with the user interface 300. Through the user interface 300, a user may specify a name 302 for the set, such as "Tattoos." In some implementations, a set name may also be considered an annotation. In addition to providing a name 302 for the set, a user may select one or more object categories 304 by interacting with the category list control 306 that provides a list of the different categories that may be associated with a set. In this example, the creator 312, Jon Smith, has selected the object category 304 of "Art" because the set is being created about tattoos, as identified by the set name 302.

In addition to specifying a category, a user may provide an annotation 308 about the purpose and/or other information about the set from the perspective of the user creating the set. In some implementations, the annotation 308 may provide information to the user or other individuals viewing the set or object identifiers within the set. The annotation 308 may also be used by the object management service 110 as a factor for determining a context for the set. Likewise, as discussed in more detail below, the annotations may be used to determine links or relationships between object identifiers and/or sets.

The creator 312 may also be able to specify whether any other users can add object identifiers to the set by including an identification of those users in the Who Can Add control 310. For example, if other users of the object management service 110 are to have the ability to add object identifiers to the created set, the creator 312 of the set may identify those users by their user name, e-mail address, or other identifier and the object management service 110 may associate those users with the set and invite those users to access the set. Finally, once a user has specified all the information for the set, the user may provide a request to the object management service 110 to create the set through selection of the create set control 314.

Figure 4:
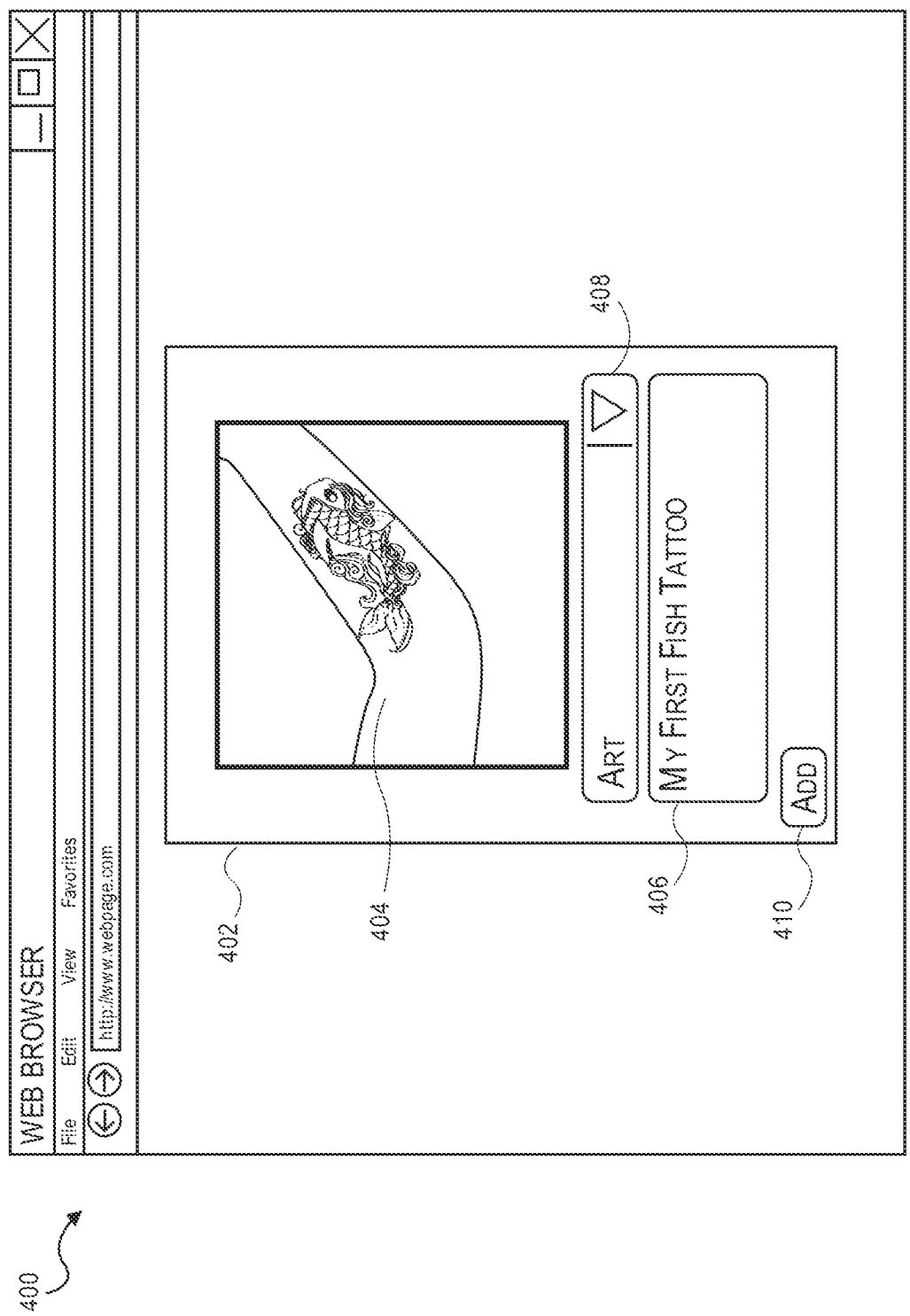
FIG. 4 is a block diagram of an example user interface for creating an object identifier, according to an implementation.

FIG. 4 is a block diagram of an example user interface 400 for creating an object identifier, according to an implementation. If the user is creating a new object identifier 402 from an existing object identifier, the new object identifier 402 may assume or inherit some of the information associated with the existing object identifier. The user may also modify other information. If the object identifier 402 is being created without utilizing another existing object identifier, the user is provided with the user interface 400 and may provide information for creating the object identifier 402.

For example, the user may provide a representation 404, annotations 406 and/or select a set with which the object identifier is to be associated by selecting the set control 408. For example, the user may provide a representation 404 of a fish tattoo and include the annotation "My First Fish Tattoo" 408. Once the user has selected a set and provided representations and/or annotations for the new object identifier 402 based on their own context, the user may complete the addition of that new object identifier 402 to the identified set through selection of the add control 410. Upon selecting the add control 410, the new object identifier 402 is associated with the selected set, a parent relationship is created and maintained if the object identifier originated from an existing object identifier, and the other information described herein is associated and maintained with the new object identifier 402, set and/or user. As discussed further below, the annotations provided by the user for the object identifier 402 may be processed to identify relationships between the object identifier and other items (e.g., other object identifiers and/or other sets), to reduce a corpus of object identifiers, to generate a set profile signature, and/or as a factor in forming collections of sets.

Figure 5:
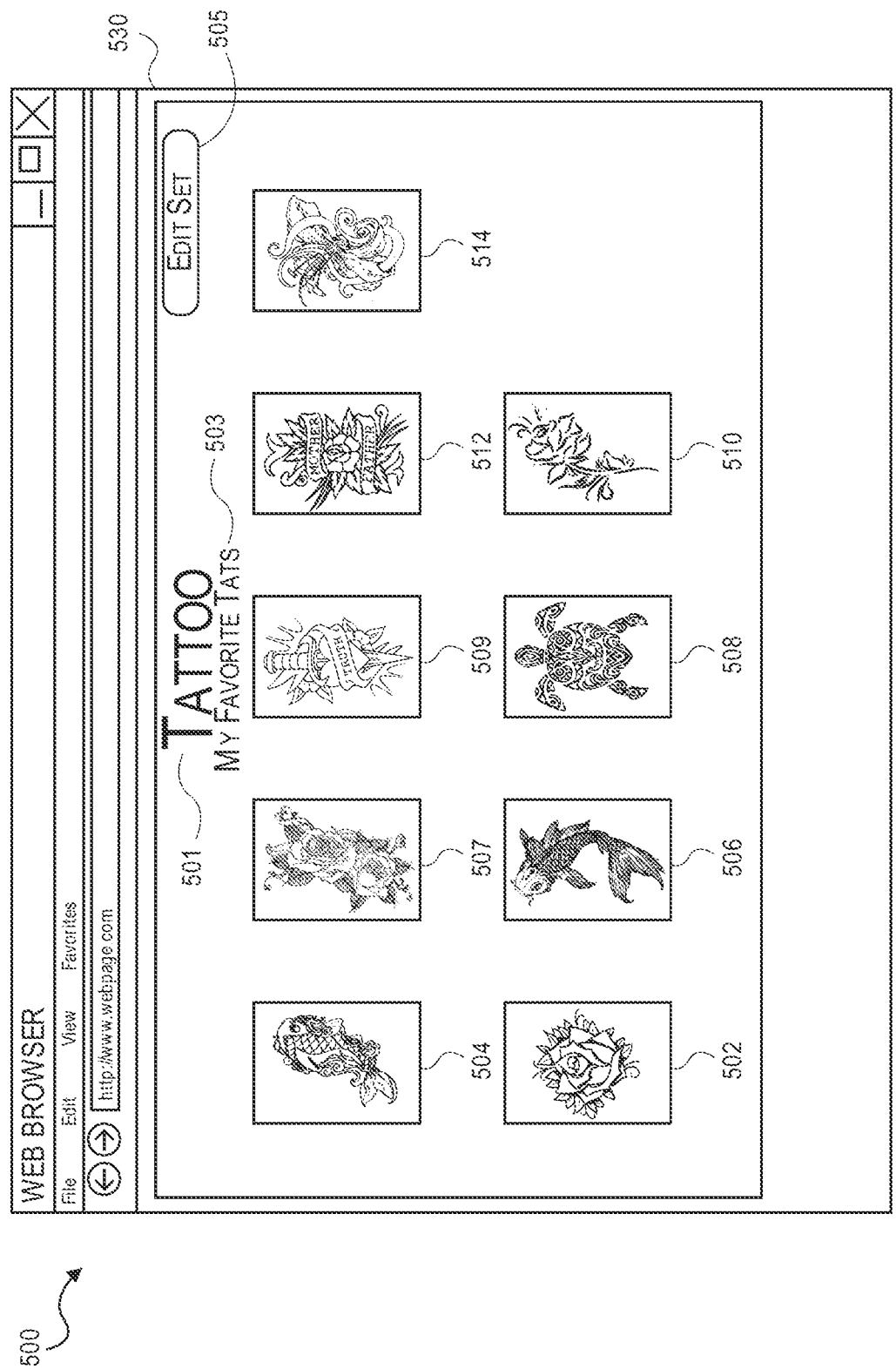
FIG. 5 is a block diagram of an example user interface for a set including multiple object identifiers, according to an implementation.

FIG. 5 is a block diagram of an example user interface 500 identifying a set 530 that includes multiple object identifiers, according to an implementation. The user interface 500 illustrated in FIG. 5 includes the name 501, "Tattoo," of the set 530 provided by the user when creating the set along with the annotation 503 for the set. A user may modify the set by selecting the edit control 505.

In this example, the user has associated nine object identifiers 502, 504, 506, 507, 508, 509, 510, 512, 514 with the set. As described herein, each object identifier may include a representation of the object, an annotation of the object provided by the user or another external source, and a source of the object and/or a source of the representation of the object.

Sets may be displayed in any variety of manners. For example, sets may be arranged based on the context of the user viewing the set, the category and/or context of the set, the object identifiers associated with the set, the date the object identifiers are added, the popularity of the object identifiers, the capabilities of the client device upon which the set will be displayed, etc. Regardless of how the object identifiers of the set are presented and/or how other items may be presented, a user can interact with the set to view the various object identifiers and/or other items. It will be appreciated that object identifiers of a set can be organized and presented in a multitude of different ways and the ones presented herein are provided only as examples.

Figure 6:
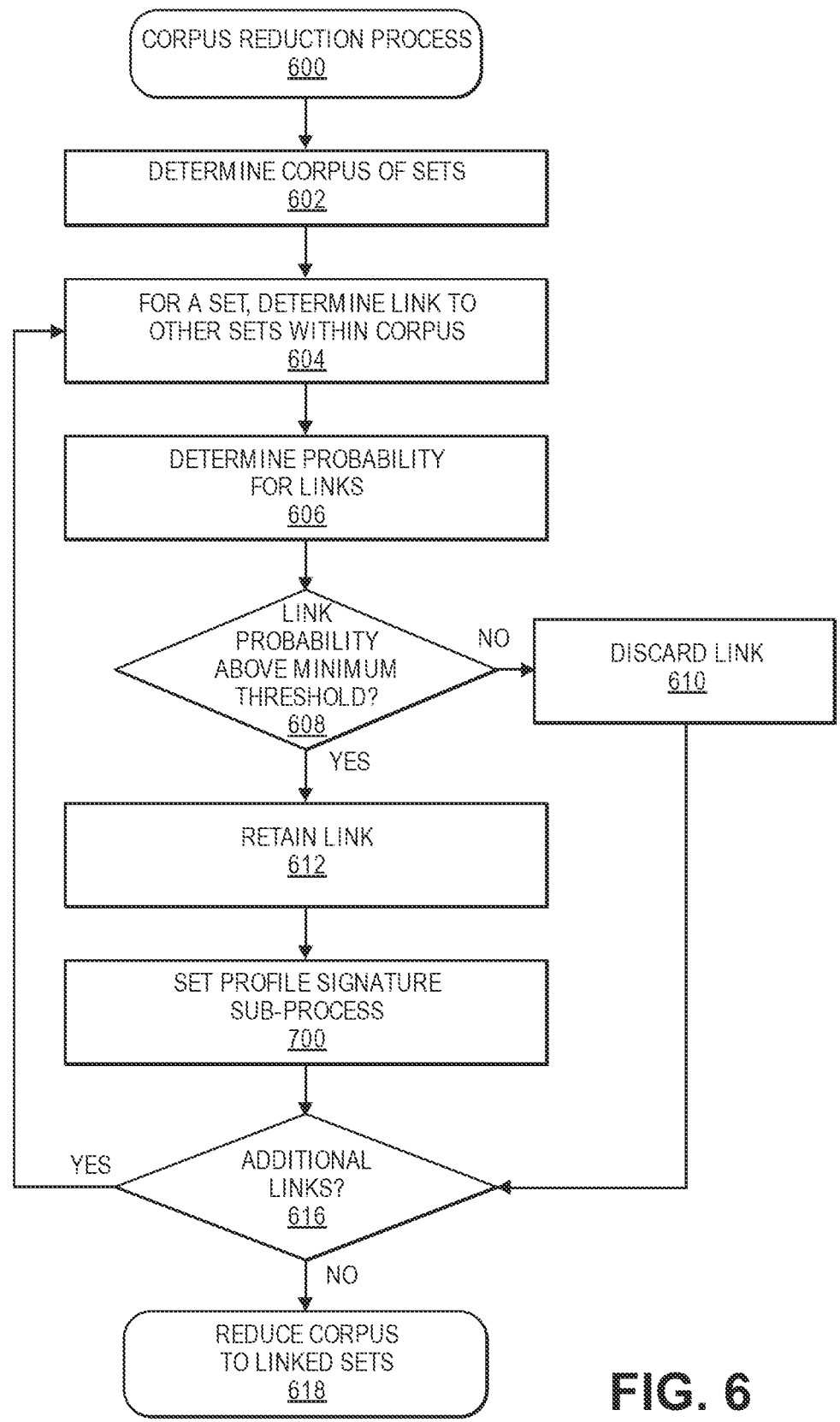
FIG. 6 illustrates an example corpus reduction process, according to an implementation.

FIG. 6 illustrates an example corpus reduction process 600, according to an implementation. The example process 600 and each of the other processes described herein are illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation and any number of the described operations can be combined in any order and/or in parallel to implement the process. Likewise, additional or fewer operations than those described may be utilized with the various implementations described herein.

The example process 600 begins by determining a corpus of sets, as in 602. As discussed above, each set includes one or more object identifiers, may also include a title, and/or may include one or more annotations. Likewise, object identifiers of a set may include one or more annotations. The annotations, associated with the sets and/or the object identifiers, may be provided by users and/or external sources. The corpus may include all sets managed by the object management service 110, and the example process 600 may consider annotations associated with object identifiers included in those sets and/or annotations of the sets. In other implementations, the corpus may be a subset of all sets managed by the object management service. For example, the corpus may include all sets created within a defined period of time (e.g., during the prior seven days), all sets with a minimum number of user views, etc.

For a set of the corpus, the example process determines links between a set (e.g., Set A) and other sets within the corpus, as in 604. Links may be direct or indirect. A direct link is any link between two sets with no intervening sets (e.g., Set A is directly linked to Set B). An indirect link is any link between two sets that includes one or more intervening sets (e.g., Set A is indirectly linked to Set C because Set A is directly linked to Set B and Set B is directly linked to Set C).

A link indicates a relationship, similarity, commonality, etc. between two sets. For example, a link between two sets may exist if each set includes the same or similar object identifier. As another example, a link between two sets may exist if the same or similar representation or image is included in different object identifiers, or if metadata (e.g., URL, hash tag, etc.) associated with different object identifiers and/or representations are the same between the two sets.

For each link, a probability is determined that indicates a likelihood that a user will traverse or navigate from a starting set (e.g., Set A) to another linked set (e.g., Set B, Set C), as in 606. In one implementation, a distributed random walk is performed from a set (e.g., Set A) a defined number of times and a probability is determined for each link indicating a likelihood that a user starting at the set (e.g., Set A) will traverse or navigate to the set connected via the link.

A determination is then made for each link as to whether the probability is above a minimum threshold, as in 608. The minimum threshold may be any value or amount and may vary for different links, different corpus of sets, etc. In general, the minimum threshold is determined to reduce the number of linked sets to remove those for which there is a low probability of traversal. If it is determined that the probability does not exceed the minimum threshold, the link is discarded, as in 610. For example, the minimum threshold may be thirty-percent and any link to a set that has a probability below thirty-percent may be discarded. If it is determined that the probability exceeds the minimum threshold, the link is retained, as in 612.

If a link is retained, the set profile signature sub-process 700 (FIG. 7) is performed for the set that remains linked via the retained link. The set profile signature sub-process 700, upon completion, returns a set profile signature representative of the set to which the link was retained. The set profile signature sub-process 700 is discussed in further detail below with respect to FIG. 7. As discussed below, a set profile signature provides a profile signature for the set corresponding to annotations associated with object identifiers of the set. For example, if a set includes multiple object identifiers corresponding to tattoos, with annotations such as "bird tattoo," "animal tattoo," a profile signature representative of the set is determined from the annotations of the object identifiers and associated with the set.

Returning to FIG. 6, upon completion of the set profile signature sub-process, a determination is then made as to whether there are additional links that remain to be considered by the example process 600, as in 616. If additional links remain for consideration, the example process 600 returns to block 604 and continues. If all links have been considered and either retained or discarded, the corpus is reduced to include sets for which links were retained, as in 618.

In general, the example process 600 reduces a large corpus of sets using a two-step process to review similar or related sets based not just on the link between the sets but the similarity of the linked sets as determined by user provided annotations corresponding to object identifiers associated with those linked sets. Sets that otherwise may not be related or discovered by a user (e.g., they have a weak or lower probability link) may have a stronger connection based on the set profile signature. As such, discovery of sets that are similar based on the annotations provided by users is improved.

Figure 7:
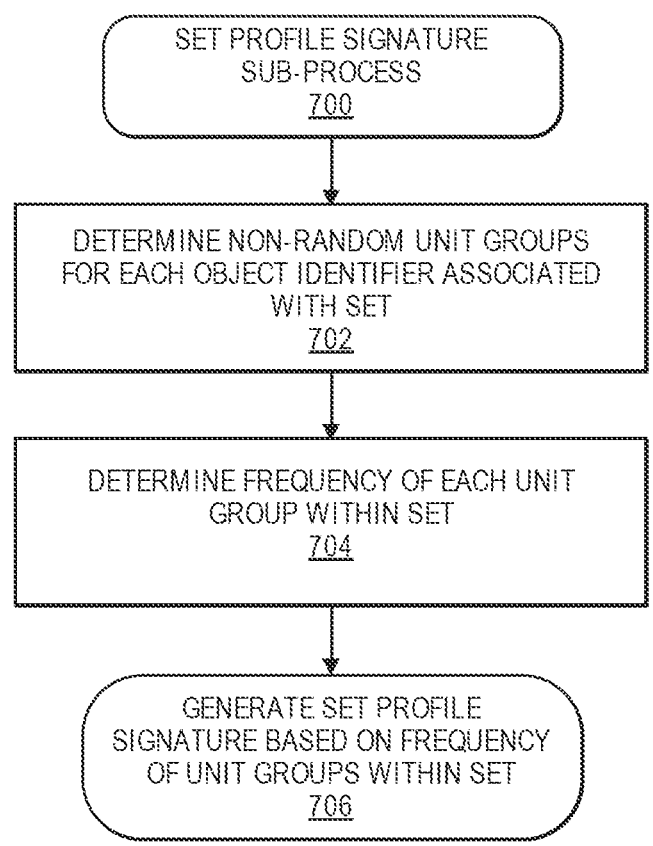
FIG. 7 illustrates an example set profile signature sub-process, according to an implementation.

FIG. 7 is a flow diagram illustrating an example set profile signature sub-process 700, according to an implementation. As discussed above, the set profile signature sub-process 700 is performed for sets for which a link has been retained as part of the example process 600. The example sub-process 700 begins by identifying non-random unit groups included in the annotations of the object identifiers associated with the set, as in 702. In some implementations, the joint probability of the units appearing together may be compared to the probability of the units appearing separately. If the joint probability of the units appearing together is higher than the probability of the units appearing separately, the group of units is identified as a non-random unit group. A non-random unit group may be any combination of one or more units (e.g., annotations).

To illustrate, when processing the annotations of a set, the units "Arm" and "Tattoo" may be identified. It may be determined that the joint probability of the two units "Arm Tattoo" appearing together is higher than the probability of the units "Arm" and "Tattoo" appearing independently. In some implementations, the joint probability of the two units appearing together and the probability of the units appearing separately may be determined based on the frequency with which the units appear in the set of object identifiers and/or in annotations within the corpus. In some implementations, pointwise mutual information, or pointwise mutual probability, may be computed to determine how informative the occurrence of one unit is about the occurrence of another unit. For example, it may be determined that the information about Arm is increased if followed by the unit Tattoo. In such an instance, there is a higher probability that these units will appear together.

Based on this information, the example sub-process 700 may identify the units "Arm Tattoo" as a non-random unit group. As another example, the units "Fish" and "Tat" may also be identified. However, it may be determined that the joint probability of the units "Fish Tat" is not higher than the probability of the units "Fish" and "Tat" appearing separately. As such, the unit group "Fish Tat" may not be identified as a non-random unit group. As will be appreciated, depending on the annotations being processed, the identified non-random unit groups may vary.

For each identified non-random unit group, the example sub-process 700 may determine the frequency with which each non-random unit group appears in the object identifiers associated with the set, as in 704. Based on the frequency of the identified non-random units of the set, a set profile signature is generated that represents the set, as in 706. In some implementations, all identified non-random unit groups may be included in the set profile signature. In other implementations, a threshold may be established and only non-random unit groups that exceed a minimum frequency for the set may be included in the set profile signature. In other implementations, abusive unit groups (e.g., foul language) may also be identified and removed. For example, some unit groups may be pre-identified as abusive. When these unit groups are identified they may automatically be removed as not providing useful information. In some implementations, the actual unit groups may be removed from the object identifiers and/or sets. In still other implementations, the object identifiers and/or sets that include abusive unit groups may be identified and removed. In some implementations individual units, such as "fish" and/or "tat" may be considered a non-random unit group and included in the set profile signature.

In some implementations a discount factor may be determined for each unit group of a set and unit groups with a high discount factor may be removed and not included in the set profile signature. For example, a discount factor may be determined for each non-random unit group identified for a set and the discount factor may be used to determine whether to include the non-random unit group in the set profile signature.

Based on the set, a unit group associated with the object identifiers of the set is selected for review. For the selected unit group, a frequency with which the unit group appears in the set is determined. Based on the frequency, a quotient (X) is determined as follows:

Frequency Of Unit Group In Set/Number Of Object Identifiers In Set=$X$

Finally, the log of the quotient (X) may be computed and utilized as the discount factor for the selected unit group:

$\log(X)$=discount factor

If the discount factor exceeds a defined maximum, the unit group may be excluded from the set profile signature. For example, if every object identifier of a set includes the annotation "tattoo" (a unit group) a high discount factor may be determined, and the unit group "tattoo" may be excluded from the set profile signature. In some implementations, the discount factor may be based on the frequency of the unit group across the entire corpus, rather than just the set, and based on the number of object identifiers in the corpus. In such an example, if the unit group "tattoo" appears with a high frequency across the entire corpus it will have a high discount factor and be excluded from the set profile signature because it does not provide meaningful information that distinguishes the set from other sets of the corpus. In comparison, if the discount factor is low, the unit group may be retained and included in the set profile signature for the set. As discussed below, set profile signatures may be compared to form collections of sets that have similar set profile signatures.

Figure 8:
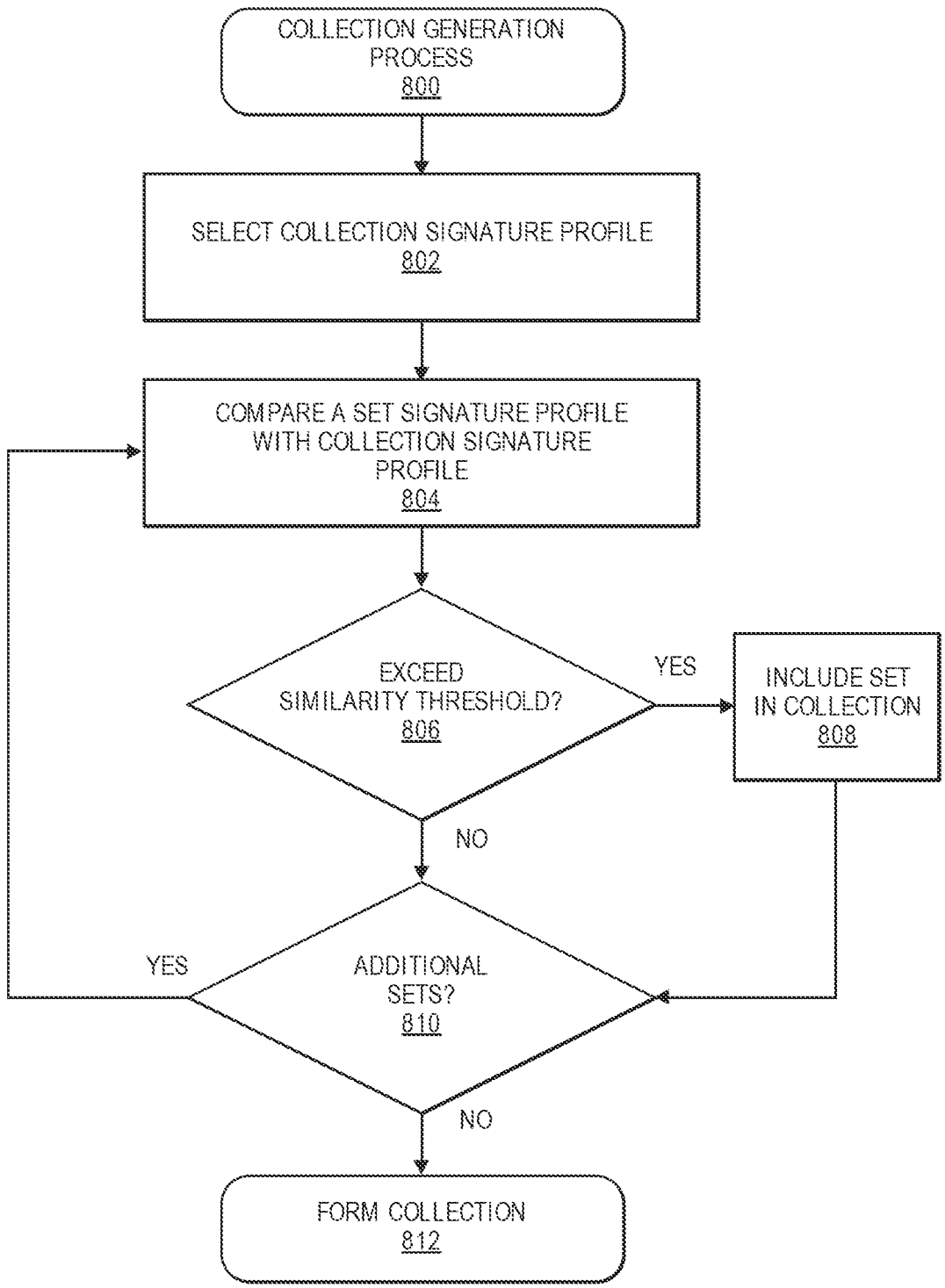
FIG. 8 illustrates an example collection generation process, according to an implementation.

FIG. 8 is a flow diagram illustrating an example collection generation process 800, according to an implementation. The example process 800 is performed on the reduced corpus formed from the example process 600 and utilizes the similarities of sets as represented by the set profile signatures determined from user provided annotations associated with object identifiers included on those sets. The example process 800 begins by selecting a collection profile signature, as in 802. A collection profile signature may be, for example, a set profile signature associated with an existing set, such as a set that is popular among users, a set that is formed with specific object identifiers. In other implementations, the collection profile signature may be a predefined signature profile corresponding to a particular category, topic, news feed, user interest or intent, idea, etc.

Upon selection of the collection profile signature, a set profile signature corresponding to a set that remains in the reduced corpus is compared with the collection profile signature to determine a similarity score indicating a similarity between the two signature profiles, as in 804. For example, the similarity score may be based at least in part on a frequency of occurrence of different unit groups between the collection profile signature and the set profile signature. Based on the comparison, a determination is made as to whether the similarity score exceeds a similarity threshold, as in 806. The similarity threshold may be any value or amount and may vary for different collections, different collection profile signatures, different set profile signatures, different corpus of sets, etc.

If it is determined that the similarity score exceeds the similarity threshold, the set is included in the collection, as in 808. However, if it is determined that the similarity score does not exceed the similarity threshold, the set is excluded from the collection. After including the set in the collection, or if it is determined that the similarity score does not exceed the threshold, a determination is made as to whether there are additional sets of the reduced corpus that are to be compared to the collection profile signature, as in 810. If it is determined that there are additional sets within the reduced corpus that are to be compared to the collection similarity profile, the example process 800 returns to block 804 and continues. If it is determined that there are no other sets of the reduced corpus to compare with the collection profile signature, the example process 800 completes, as in 812.

Figure 9:
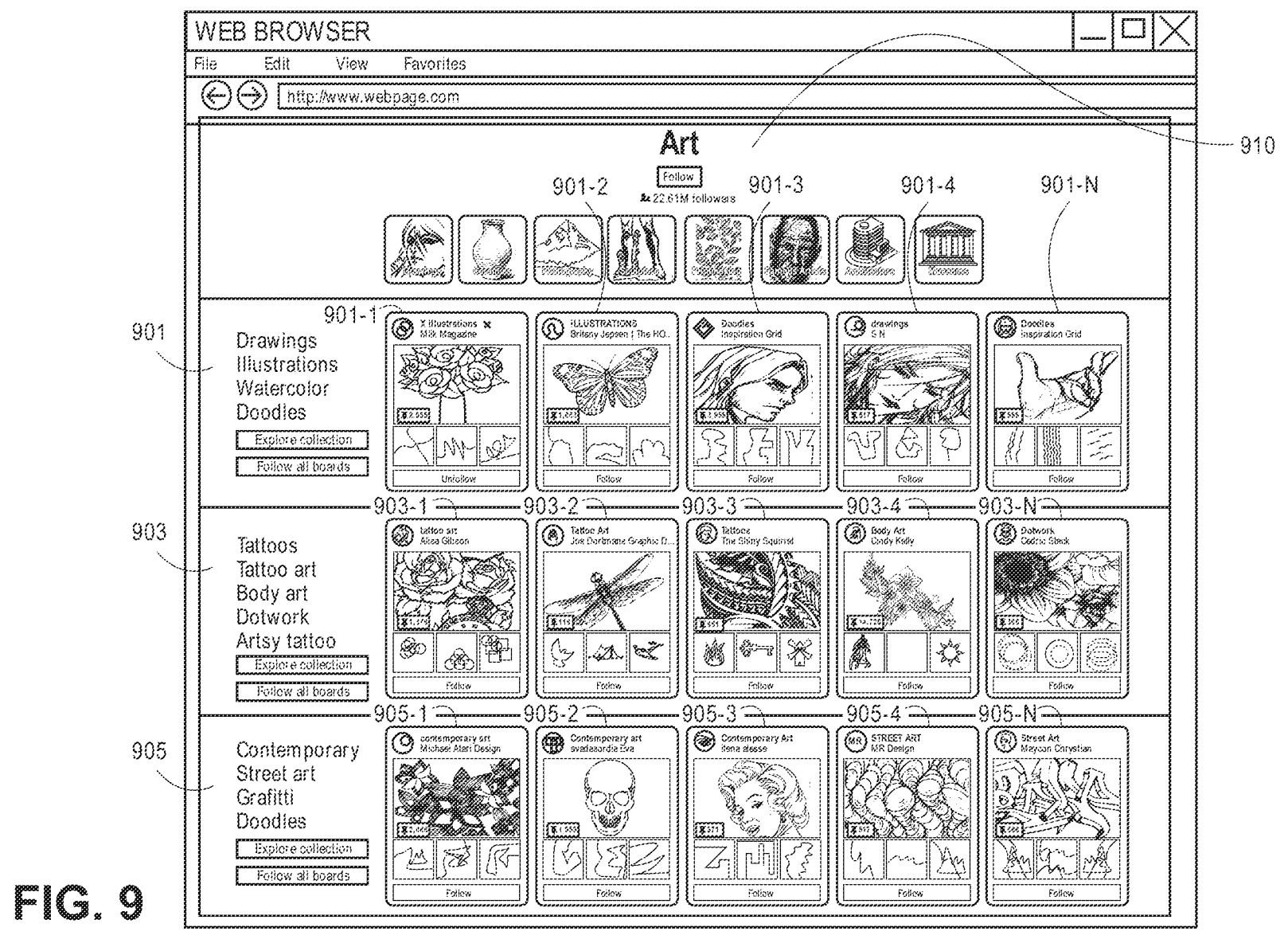

FIG. 9 illustrates an example user interface illustrating multiple collections of sets, each set including multiple object identifiers, according to an implementation. The collection sets may be generated from a reduced corpus of collection sets, as determined by example process 600 (FIG. 6) and based on the example process 800 (FIG. 8). Each of the collections are generated from the reduced corpus of sets, as discussed above. In the illustrated user interface, there are three collections 901, 903, 905 of sets and one larger collection 910 that includes the three collections 901, 903, 905. Specifically, the processing of the sets using the example process 600 discussed above reveals sets 901-1, 901-2, 901-3, 901-4 . . . 901-N having similar set profile signatures that have been grouped into a collection 901 called "Drawings." As will be appreciated a collection may include any number of sets. The sets 901-1, 901-2, 901-3, 901-4 . . . 901-N are included in the Drawings collection 901 because the set profile signatures determined for each of sets 901-1, 901-2, 901-3, 901-4 . . . 901-N are similar and similar to a collection profile signature corresponding to Drawings.

The processing of the sets using the example process 600 also identifies sets 903-1, 903-2, 903-3, 903-4 . . . 903-N that form the collection 903 called "Tattoos." The sets 903-1, 903-2, 903-3, 903-4 . . . 903-N are included in the Tattoos collection 903 because the set profile signatures determined for each set 903-1, 903-2, 903-3, 903-4 . . . 903-N are similar and similar to a collection profile signature corresponding to Tattoos.

The processing of the sets using the example process 600 also identifies sets 905-1, 905-2, 905-3, 905-4 . . . 905-N that form the collection 905 called "Contemporary." The sets 905-1, 905-2, 905-3, 905-4 . . . 905-N are included in the Contemporary collection 905 because the set profile signatures determined for each set 905-1, 905-2, 905-3, 905-4 . . . 905-N are similar and similar to a collection profile signature corresponding to Contemporary art.

In addition to determining collections 901, 903, 905 based on the set profile signatures determined from user provided annotations associated with the object identifiers of each set, the collections 901, 903, 905 may be grouped into a larger collection 910, called "Art." In this example, the similarity between the signature profiles of all the different sets 901-1, 901-2, 901-3, 901-4 . . . 901-N, 903-1, 903-2, 903-3, 903-4 . . . 903-N, 905-1, 905-2, 905-3, 905-4 . . . 905-N is sufficiently similar that even though they are not included in the same collections, those collections may be included in a larger collection 910.

While the examples discussed herein relate for forming collections of sets that are presented to users to aid in discovery of object identifiers and/or sets, the described implementations may likewise be used to, for example, identify sets that should be removed, eliminated, or otherwise not provided to users. For example, a collection profile signature relating to profanity, nudity, etc., may be used with the implementations discussed herein to identify sets that include object identifiers corresponding to material (e.g., profanity, nudity) that is to be removed from the system and/or not presented to users. In still other examples, collection profile signatures relating to particular topics, events, seasons, etc., may be used to generate collections of sets that correspond to those collection profile signatures, based on annotations provided by users that are associated with object identifiers of those sets.

Figure 10:
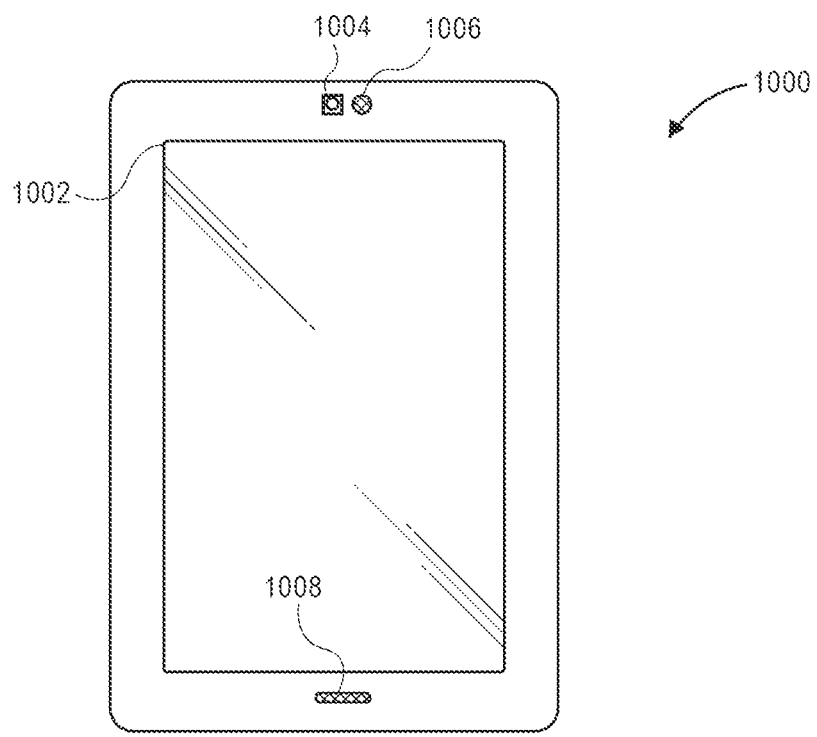
FIG. 10 illustrates an example computing device that can be used in accordance with various implementations.

FIG. 10 illustrates an example client device 1000 that can be used in accordance with various implementations described herein. In this example, the client device 1000 includes a display 1002 and optionally at least one input component 1004, such as a camera, on a same side of the device as the display 1002. The client device 104 may also include an audio transducer, such as a speaker 1006, and optionally a microphone 1008. Generally, the client device 1000 may have any form of input/output components that allow a user to interact with the client device 1000. For example, the various input components for enabling user interaction with the device may include a touch-based display 1002 (e.g., resistive, capacitive), camera (for gesture tracking, etc.), microphone, global positioning system (GPS), compass, accelerometer, gyroscope, and/or any combination thereof. One or more of these input components may be included on a device or otherwise in communication with the device. Various other input components and combinations of input components can be used as well within the scope of the various implementations as should be apparent in light of the teachings and suggestions contained herein.

Figure 11:
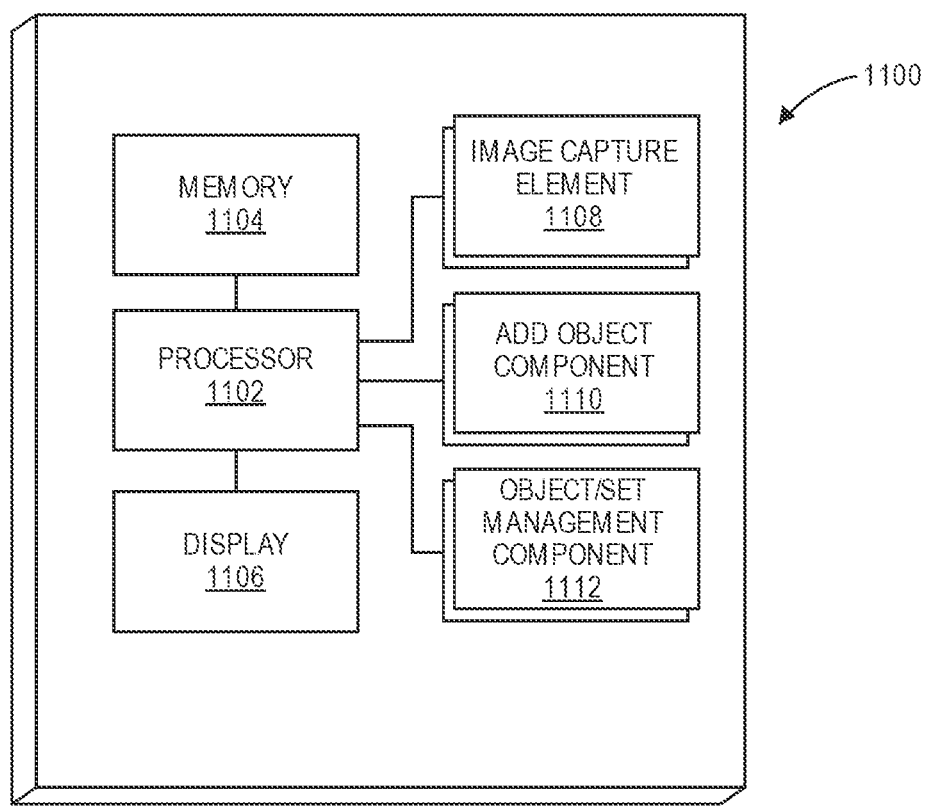
FIG. 11 illustrates an example configuration of components of a computing device, such as that illustrated in FIG. 10.

In order to provide the various functionality described herein, FIG. 11 illustrates an example set of basic components 1100 of a client device 1000, such as the client device 1000 described with respect to FIG. 10 and discussed herein. In this example, the device includes at least one central processor 1102 for executing instructions that can be stored in at least one memory device or element 1104. As would be apparent to one of ordinary skill in the art, the device can include many types of memory, data storage or non-transitory computer-readable storage media, such as a first data storage for program instruction for execution by the processor 1102. Removable storage memory can be available for sharing information with other devices, etc. The device typically will include some type of display 1106, such as a touch-based display, electronic ink (e-ink), organic light emitting diode (OLED) or liquid crystal display (LCD).

As discussed, the device in many implementations will include at least one image capture element 1108, such as one or more cameras that are able to image objects in the vicinity of the device. An image capture element can include, or be based at least in part upon any appropriate technology, such as a CCD or CMOS image capture element having a determined resolution, focal range, viewable area, and capture rate. The device can include at least one add object component 1110 for performing the process of creating an object identifier that identifies an object, and/or interacting with the object management service 110 as part of the process of creating an object identifier that identifies an object. For example, the client device may be in constant or intermittent communication with the object management service 110 and may exchange information, such as representations, annotations, source information, etc. with the object management service 110 as part of the process for creating an object identifier for an object.

The device may also include an object/set management component 1112 that stores and manages information about existing object identifiers, sets created by or otherwise associated with the user of the client device and/or relationships between items. Storing and maintaining such information on the device provides the ability for a user to interact with and use many of the various implementations discussed herein even in the event the client device cannot communicate with the object management service 110.

The device also can include at least one location element, such as GPS, NFC location tracking or Wi-Fi location monitoring. Location information obtained by the location element may be used with the various implementations discussed herein to identify the location of the user, source location, object location, and the like and support the creation, modification and/or management of sets and/or object identifiers.

The example client device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations. In some implementations, however, such a device might not include any buttons at all and might be controlled only through touch (e.g., touch-based display), audio (e.g., spoken) commands, or a combination thereof.

Figure 12:
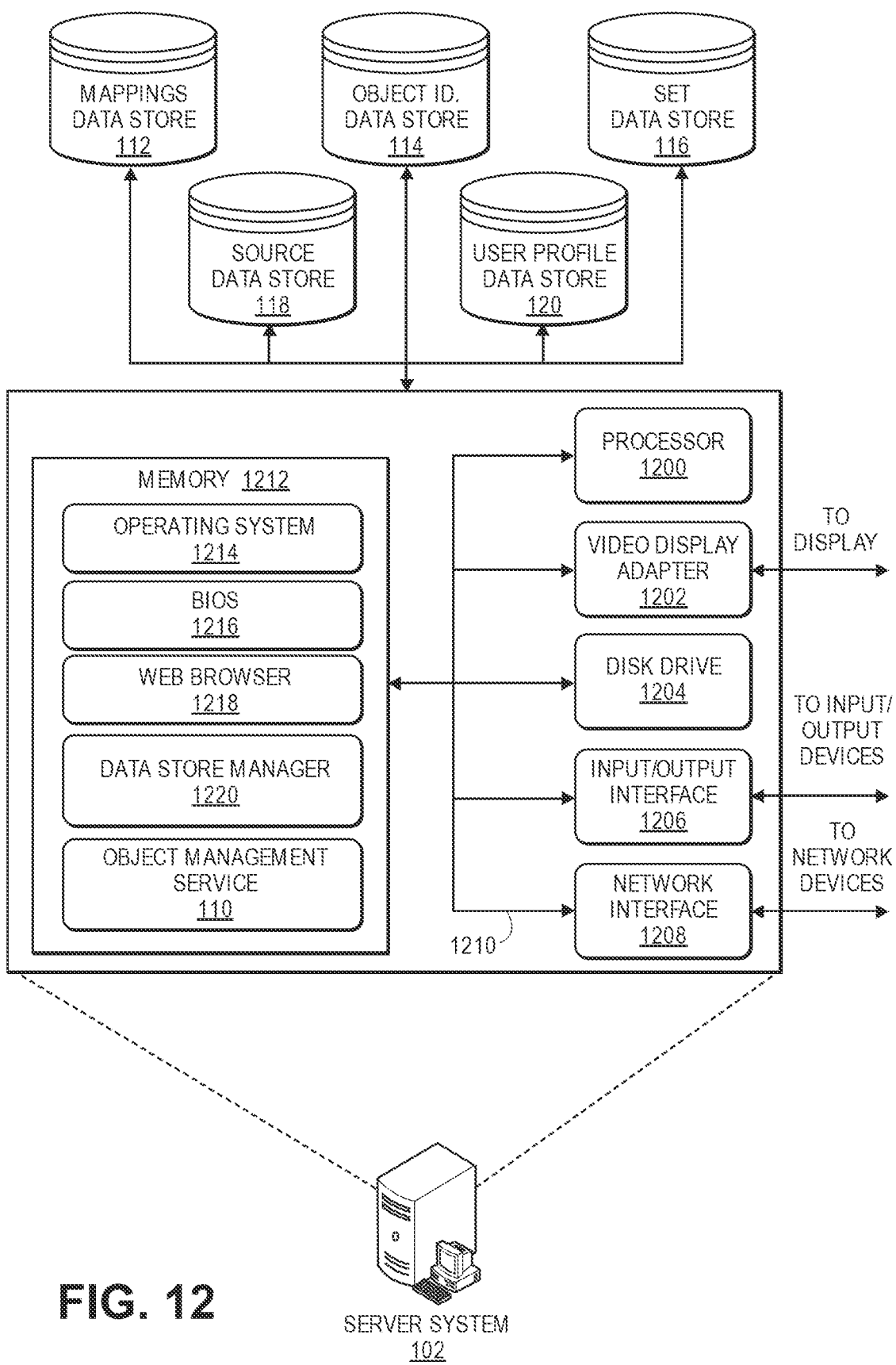
FIG. 12 is a pictorial diagram of an illustrative implementation of a server system that may be used for various implementations.

FIG. 12 is a pictorial diagram of an illustrative implementation of a server system, such as the server system 102, that may be used in the environment of FIG. 1. The server system 102 may include a processor 1200, such as one or more redundant processors, a video display adapter 1202, a disk drive 1204, an input/output interface 1206, a network interface 1208, and a memory 1212. The processor 1200, the video display adapter 1202, the disk drive 1204, the input/output interface 1206, the network interface 1208, and the memory 1212 may be communicatively coupled to each other by a communication bus 1210.

The video display adapter 1202 provides display signals to a local display permitting an operator of the server system 102 to monitor and configure operation of the server system 102. The input/output interface 1206 likewise communicates with external input/output devices not shown in FIG. 12, such as a mouse, keyboard, scanner, or other input and output devices that can be operated by an operator of the server system 102. The network interface 1208 includes hardware, software, or any combination thereof, to communicate with other computing devices. For example, the network interface 1208 may be configured to provide communications between the server system 102 and other computing devices, such as the client device 104, via the network 108, as shown in FIG. 1.

The memory 1212 generally comprises non-transitory computer-readable memory, such as random access memory (RAM), read-only memory (ROM), flash memory, and/or other volatile or permanent memory. The memory 1212 is shown storing an operating system 1214 for controlling the operation of the server system 102. A binary input/output system (BIOS) 1216 for controlling the low-level operation of the server system 102 is also stored in the memory 1212.

The memory 1212 additionally stores program code and data for providing network services that allow client devices 104 and external sources 106 to exchange information and data files with the server system 102 and/or the object management service 110. Accordingly, the memory 1212 may store a browser application 1218. The browser application 1218 comprises computer executable instructions that, when executed by the processor 1200, generate or otherwise obtain configurable markup documents such as Web pages. The browser application 1218 communicates with a data store manager application 1220 to facilitate data exchange and mapping between the mappings data store 112, the object identifier data store 114, the set data store 116, the source data store 118 and/or the user profile data store 120, client devices, such as the client device 104 shown in FIG. 1 and/or external sources, such as the external sources 106 shown in FIG. 1.

As used herein, the term "data store" refers to any device or combination of devices capable of storing, accessing and retrieving data, which may include any combination and number of data servers, databases, data storage devices and data storage media, in any standard, distributed or clustered environment. The server system 102 can include any appropriate hardware and software for integrating with the data stores 112, 114, 116, 118, and 120 as needed to execute aspects of one or more applications for the client device 104, the external sources 106 and/or the object management service 110. The server system 102 provides access control services in cooperation with the data stores 112, 114, 116, 118, and 120 and is able to generate content such as text, graphics, audio, video, object identifier, set related information (e.g., representations, context, annotations, mappings, analytics about user interfaces), collections, etc., to be transferred to the client device 104 or external sources 106.

The data stores 112, 114, 116, 118, and 120 can include several separate data tables, databases or other data storage mechanisms and media for storing data relating to a particular aspect. For example, the data stores 112, 114, 116, 118, and 120 illustrated include mechanisms for storing content, user information, mappings and external source information, representations, which can be used to generate and deliver content to client devices 104 and/or external sources 106 (e.g., sets, object identifiers, representations, collections) and control actions to be performed.

It should be understood that there can be many other aspects that may be stored in the data stores 112, 114, 116, 118, and 120, such as access rights information, which can be stored in any of the above listed mechanisms as appropriate or in additional mechanisms of any of the data stores 112, 114, 116, 118, and 120. The data stores 112, 114, 116, 118, and 120 are operable, through logic associated therewith, to receive instructions from the server system 102 and obtain, update or otherwise process data in response thereto. In one example, an external source might submit a request to associate supplemental information with a representation of an object. In this case, the source data store 118 might access the source's profile information to verify the source and whether the source is associated with the representation. The information can then be returned to the user, such as in a user interface delivered to a client device 104 that the user is able to view.

The memory 1212 may also include the object management service 110, discussed above. The object management service 110 may be executable by the processor 1200 to implement one or more of the functions of the server system 102. In one implementation, the object management service 110 may represent instructions embodied in one or more software programs stored in the memory 1212. In another implementation, the object management service 110 can represent hardware, software instructions, or a combination thereof.

The server system 102, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction in FIG. 12 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system, comprising:
one or more processors; and
a memory coupled to the one or more processors and storing program instructions that when executed by the one or more processors cause the one or more processors to at least:
obtain a plurality of sets, each of the plurality of sets including one or more object identifiers and a link to at least one other set of the plurality of sets having a probability of traversal that is greater than a threshold value;
identify a first set from the plurality of sets, the first set including one or more first object identifiers;
obtain at least one annotation associated with the one or more first object identifiers of the first set;
identify a non-random unit group in the at least one annotation;
determine a frequency of the non-random unit group within the at least one annotation associated with the one or more first object identifiers of the first set;
determine, based at least in part on the frequency of the non-random unit group, a set profile signature for the first set that is representative of the first set.

2. The computing system of claim 1, wherein the set profile signature is further determined based at least in part on a title of the first set or one or more further non-random unit groups identified from the at least one annotation associated with the one or more first object identifiers of the first set.

3. The computing system of claim 1, wherein the at least one annotation is static information associated with the one or more first object identifiers.

4. The computing system of claim 1, wherein the frequency is determined based at least in part on a second frequency of the non-random unit group within a plurality of annotations associated with the plurality of sets.

5. The computing system of claim 1, wherein the program instructions, when executed by the one or more processors, include further instructions to further cause the one or more processors to at least:
identify a second set from the plurality of sets, the second set including one or more second object identifiers;
obtain at least one second annotation associated with the one or more second object identifiers of the second set;
identify a second non-random unit group in the at least one second annotation;
determine a second frequency of the second non-random unit group within the at least one second annotation associated with the one or more second object identifiers of the second set;
determine, based at least in part on the second frequency of the second non-random unit group, a second set profile signature for the second set that is representative of the second set;
form a collection of sets including the first set and the second set based at least in part on the set profile signature and the second set profile signature; and
send, for presentation, at least some of the first set and the second set.

6. A computer-implemented method, comprising:
obtaining a first set including one or more object identifiers;
obtaining at least one annotation associated with the one or more object identifiers of the first set;
identifying a unit group from the at least one annotation;
determining that the unit group is a non-random unit group;
determining a frequency that the unit group appears in the at least one annotation associated with the one or more object identifiers of the first set; and
determining, based at least in part on the frequency of the unit group, a set profile signature for the first set that is representative of the first set.

7. The computer-implemented method of claim 6, further comprising:

identifying a second unit group from the at least one annotation;
determining that the second unit group is a non-random unit group;
determining a second frequency the second unit group appears in the at least one annotation associated with the one or more object identifiers of the first set; and
determining the set profile signature further based at least in part on the second frequency of the second unit group.

8. The computer-implemented method of claim 6, further comprising:
obtaining a second set including a second set profile signature and one or more second object identifiers, the second set having a link to the first set;
forming a collection of sets including the first set and the second set based at least in part on the set profile signature and the second set profile signature; and
sending, for presentation, at least some of the first set and second set.

9. The computer-implemented method of claim 6, wherein the at least one annotation is static information that is provided by a user.

10. The computer-implemented method of claim 6, wherein determining that the unit group is a non-random unit group includes:
determining that a first probability of each unit making up the unit group appearing together is greater than a second probability of each unit making up the unit group appearing separately.

11. The computer-implemented method of claim 6, further comprising:
determining, based at least in part on the frequency, a discount factor associated with the unit group.

12. The computer-implemented method of claim 11, wherein the first set is one set from a corpus of sets and the discount factor is based at least in part on a plurality of annotations associated with a plurality of object identifiers included in the corpus of sets.

13. The computer-implemented method of claim 6, wherein determining the set profile signature based at least in part on the frequency of the unit group includes determining that the frequency exceeds a threshold value.

14. The computer-implemented method of claim 6, further comprising:
identifying an abusive annotation from the at least one annotation; and
filtering the at least one annotation to remove the abusive annotation.

15. The computer-implemented method of claim 6, wherein determining the set profile signature is further based at least in part on a title of the first set.

16. A computing system, comprising:
one or more processors; and
a memory coupled to the one or more processors and storing program instructions that when executed by the one or more processors cause the one or more processors to at least:
obtain a first plurality of sets, each of the first plurality of sets including one or more object identifiers and a set link to at least one other set of the first plurality of sets;
determine a probability of traversal associated with each set link;
generate a second plurality of sets from the first plurality of sets by removing sets linked via a link having a respective probability of traversal below a threshold value;
for each of the second plurality of sets:
obtain at least one annotation associated with the one or more object identifiers of the set;
identify a non-random unit group in the at least one annotation;
determine a frequency of the non-random unit group within a plurality of annotations associated with the second plurality of sets; and
determine, based at least in part on the frequency of the non-random unit group, a set profile signature for the set that is representative of the set.

17. The computing system of claim 16, wherein determination of the frequency includes determining a discount factor associated with the non-random unit group.

18. The computing system of claim 16, wherein the at least one annotation is static information that is provided by a user.

19. The computing system of claim 16, wherein the program instructions, when executed by the one or more processors, include further instructions to further cause the one or more processors to at least:
form, based at least in part on the set profile signatures, a collection that includes at least some of the sets from the second plurality of sets; and
send for presentation the at least some of the sets of the collection.

20. The computing system of claim 16, wherein the non-random unit group includes a plurality of units having a first probability that each of the plurality of units making up the non-random unit group appearing together is greater than a second probability that each of the plurality of units making up the non-random unit group appearing separately.

* * * * *